United States Patent [19]

Hawkins et al.

[11] Patent Number: 5,019,149

[45] Date of Patent: May 28, 1991

[54] FERTILIZER AND METHOD FOR FOLIAR TREATMENT OF IRON-DEFICIENT PLANTS

[76] Inventors: Edwin F. Hawkins, Baton Rouge, La.; John G. Clapp, Jr., Greensboro; James E. Sansing, Ashboro, both of N.C.

[21] Appl. No.: 778,865

[22] Filed: Sep. 23, 1985

Related U.S. Application Data

[63] Continuation-in-part of Ser. No. 338,465, Jan. 11, 1982, abandoned, which is a continuation of Ser. No. 115,455, Jan. 25, 1980, abandoned.

[51] Int. Cl.$^5$ .................... C05C 9/00; C05C 13/00; C05G 3/00
[52] U.S. Cl. .......................... 71/29; 71/30; 71/64.1; 71/DIG. 2
[58] Field of Search ................. 71/DIG. 2, 27, 28, 29, 71/30

[56] References Cited

U.S. PATENT DOCUMENTS 3,753,675  8/1973  Young ........................ 71/DIG. 2
4,249,930  2/1981  Atkinsson .................. 71/DIG. 2

*Primary Examiner*—Ferris H. Lander
*Attorney, Agent, or Firm*—William T. Hough

[57] ABSTRACT

A foliar fertilizer specifically for iron deficient plants which contains a complex of various ingredients such as citric acid admixed/reacted with ferrous sulfate previously converted at-least predominantly to ferric sulfate by oxidation at about 90 degrees or more centigrade or a neutralizing amount of ammonium ion, to a pH ranging from about pH 6 to about pH 7, the ferrous sulfate being typically produced by reaction of iron metal with sulfuric acid, excluding the presence of any phosphate salt, neutralized with NH$_4$OH, then admixed with urea and/or ammonium nitrate, the total mixture critically having a nitrogen-to-iron ratio of not less than (i.e., at least) 3/1, preferably within a range of about 4/1 to about 5/1, in aqueous solution, and the method including using the above-noted fertilizer complex as a source, diluting with water such that the source as a percentage ranges from about 5% to about 40%, followed by foliar spraying onto plant foliage, up to an application of about 5 lbs. of iron per acre, the chemical composition including typically about 60% citrate by weight relative to iron, total nitrogen being typically about 10-30 wt. % of the chemical composition.

21 Claims, No Drawings

FERTILIZER AND METHOD FOR FOLIAR TREATMENT OF IRON-DEFICIENT PLANTS

This application is a continuation-in-part of U.S. Ser. No. 338,465 filed Jan. 11, 1982 which was a continuation of U.S. Ser. No. 115,455, both now abandoned.

This invention relates to treatment of iron deficient plants found in geographical areas having low-iron soil content, by the employment of a novel iron-containing fertilizer by a foliar spray method.

BACKGROUND

Prior to the present invention, there have been fertilizers specifically designed/formulated for the nutritional-treatment of iron-deficient plants by foliar treatment with solubilized-iron ethylenediamine tetraacetic acid (EDTA), a sulfate foliar chelated-iron aqueous solution of which a typical commercially-available fertilizer is Sequestrene 138 (Ciba-Geigy trademark). Greenol(-Chevron Chem.) analyzes at 6.13% Fe(iron), 0.13% Cu(copper), 0.10% Zn(zinc) and 3.64% S(sulfur). Citric acid alone has likewise been recognized in prior art to be a sequestering agent. While iron must be made soluble in order to be assimilated by plants, whether by roots or by foliage to which it has been applied, virtually all iron present must be present in some special form or complex in order to not destroy the foliage by foliage phototoxicity, burn or the like. However, not every complex of iron renders it suitable for use as a foliar spay application, for example phosphate-containing iron-supplementing fertilizer interferes with foliage iron-assimilation by both physical and physio-chemical phenomenon, forming amorphous film on foliage to which applied, blocking leaf membranes and interfering with iron transport within the leaf and plant to the extent that iron is not blocked at the leaf pores. As well, phytotoxicity to the foliage is significantly greater and detrimental when a phosphate is applied thereto, as compared to other chelated iron-complexes. Accordingly, for example, the polyphosphate complex of Parham, Jr. U.S. Pat. No. 3,798,020 is totally unsuitable for use in foliar-spray treatment of iron-deficient plants, the Parham, Jr. fertilizer composition being directed exclusively to soil application, as opposed to foliar application.

More particularly, as to the above-noted Parham, Jr. patent, Mr. Parham has himself acknowledged the Parham patent's mention in column 1, lines 54–61 that foliar application of ammonium polyphosphate fertilizer (foliar application) solution incorporating amounts of one or more of the micronutrients copper, zinc, molybdenum or iron in the form of their sulfate salts as disclosed in U.S. Pat. No. 3,558,300, was intended to point-out solely that such polyphosphates incorporating such micronutrients was already known. Mr. Parham points out that the sole practical utility for a fertilizer of the type disclosed as the invention of his above-noted patent, is the utility as a soil-applied fertilizer for uptake by plant root systems, in so far as his knowledge and contemplation set-forth in that patent. Mr. Parham further states that there can be no implication from the disclosure of his patent, that use of such a composition would have adequate adsorption by the plant foliage, as is documented by "A Decade of Synthetic Chelating Agents in Inorganic Plant Nutrition", Arthur Wallace, Editor (Professor of Plant Nutrition; University of California, Los Angeles) published July 1962 by Arthur Wallace, 2278 Parnell Avenue, Los Angeles, Calif., stating on page 135 thereof "High phosphorous levels and calcium levels also decrease translocation of foliar-applied iron."

Accordingly, while phosphates may be marginally acceptable for some types of fertilizers, phosphates are detrimental and clearly unsuitable and undesirable as potential component(s) of an iron-containing fertilizer formulated and/or designed specifically to obviate iron deficiency of plants growing in geographical areas deficient in iron nutrient as a part of the natural soil. The presence of a phosphate, as above-stated and documented, would defeat substantially the purpose and possibility of success of any foliar composition containing such phosphate and the utility thereof as an iron-source foliar fertilizer. This is in contrast to fully acceptable use of phosphates for fertilizers of a type not directed to supplementing iron-nutrient in iron-deficient plant, although as noted the amorphous coating resulting from the application of a phosphate to foliage interferes with other nutrients absorption through the phosphate-blocked leaf membranes.

It will thus also be now appreciated and recognized that a specialized fertilizer such as for example the above-noted chelated-iron fertilizers, do not contain ingredients heretofore that would have been a part of some fertilizers not concerned with iron deficiency of plants. Both the invention of the above-noted Parham, Jr. patent, as to its illustrative examples as well as the control-example, that include nitrogen, in fact include such nitrogen-providing ingredient in that Parham, Jr. patent because as Parham, Jr. himself acknowledges his invention of that patent has its practical utiliity as a soil-applied fertilizer, as noted above.

The invention however pertains to also soils having iron present therein, but because of the great insolubility of iron many plants are found to be deficient in iron and in need of the special iron-providing fertilizer providing the iron in an improved form in which it may be better assimilated by the plants.

As noted-above, various iron chelates such as the chelate of ethylenediamine tetraacetic acid (EDTA) have been used to obviate the problems of iron-deficient plants resulting from the insolubility of iron when not chelated. The chelates are complexes of the metal with certain chelating agents which have two or more sites in their molecules for bonding with the metal and which are capable of forming a closed ring with the metal. In this form, the metals are stabilized and most of the solubility problems are obviated. These chelating agents, however, are relatively complex compounds which are too expensive for large scale agronomical use. In addition, many of the chelates are very stable compounds and the chelate structure hinders the utilization of the metal by the plant after its assimilation. Finally, iron complexes of organic ligands and iron salts when used in foliar sprays often cause undesirable objectionable spotting of foliage or crop.

U.S. Pat. Nos. 3,679,377 and 3,753,675 propose solutions to the above problem by utilizing iron for a soil-applied fertilizer, in aqueous solution as the ammonium, alkali metal or alkaline earth metal salt of an ion comprising a complex of trivalent iron, sulfate and hydroxo ligands with a pH of about 1 to about 3, and a sulfate to elemental iron ratio from about 0.25 to about 1.1. In U.S. Pat. No. 3,753,675 a similar complex is described as prepared by admixing an iron source with an aqueous solution of ammonium nitrate having a pH of 1 to about 3 and exposing the mixture to autooxidation conditions comprising temperature and time sufficient to cause evolution of nitrogenous gases from the mixture and form an aqueous solution having a red coloration Such fertilizer solutions have drawbacks of being corrosive to common steel and probably phytotoxic if applied as foliar spray to relieve an iron deficiency.

SUMMARY OF THE INVENTION

The present invention is a novel foliar fertilizer and method of use and preferred method of making, as a foliar iron-nutrient fertilizer for iron-deficient plants. The foliar fertilizer is a specialized formulation devoid of any significant amount of phosphate if any at all, and containing a reaction product or admixture or complex, as the case may be, of a complexing agent such as citric acid, and/or glutaric acid, and/or glutamic acid, admixed, reacted and/or complexed with a soluble salt of iron of which at-least a predominant amount thereof is ferric salt, and an ammonium salt such as typically nitrate and/or sulfate and/or chloride, and a compound or salt serving as a water-soluble nitrogen-source such as typically anhydrous ammonia, and/or nitrate and/or sulfate and/or chloride and/or a nitrogen-source of urea and/or urea derivative, the nitrogen source providing total nitrogen at at-least 9 weight-percent, preferably about 13% to about 20% by weight, and at a nitrogen-to-ferric iron ratio of at-least (not less than) 3/1, preferably within a range of about 4/1 to about 5/1, in aqueous solution, it being critical that at-least more than 50% by weight of all iron be ferric iron (i.e. predominantly ferric iron), preferably at-least 90% by weight of iron being ferric iron. The inventor by experimentation has established that ferrous iron does not achieve the inventive results such as low phytotoxicity. It has also been established that the novel combination for an iron-providing nutrient fertilizer critically requires the presence of total nitrogen in the above-specified amount from an appropriate soluble nitrogen source, it not having been previously recognized nor contemplated to use such nitrogen-source combination in an iron-providing nutrient fertilizer. It is the inventors' discovery that this combination above-noted for an iron-nutrient foliar spray is less toxic(phytotoxic) and obtains improved assimilation and transport within foliage for the iron nutrient where that nutrient is ferric iron. A particular advantage of the present invention is the minimal, low phytotoxicity of this inventive combination. The pH of the composition is critical for several reasons. When pH is above about pH 6.8, the stability is poor, resulting in precipitation-out of at-least a portion of the iron-content of the iron-nutrient fertilizer. When pH is below about pH 6, the solution becomes very corrosive of metals such as metal containers, equipement and the like associated with the storage and spraying. When pH is outside of the range of about pH 6 and pH 7, phytotoxicity increases significantly, for the composition of the present invention, such that this range is critical. Optimal pH range has been found to be about pH 6.4 to about pH 6.6, as the preferred range. For ample reasons previously stated, it is likewise critical that there be an absence of any significant phosphate content, preferably a total absence thereof since the presence thereof negates the benefits of the inventive composition.

When prepared for foliar spraying, the aqueous solution discussed-above and above-described is in a state of being diluted by the addition of additional water such that the pre-dilution fertilizer composition constitutes from about 1% by weight (i.e., 1 part per 100 parts) to about 10% by weight (i.e., 10 parts per 100 parts) of the diluted sprayable solution. Preferably there is added to the diluted solution a suitable and/or desirable and/or conventional (commercially-available) surfactant in an amount of about 0.5 to about 1% by weight. Likewise, the diluted solution also contains preferably a humectant in an amount of about 1% to about 5% by volume of the diluted solution. A typical commercially available surfactant that may be utilized is Tween 80(trademark), for example. As the humectant, there are many commercially available alternatives, and any desired and/or conventional humectant may be utilized. The surfactant improves asimilation and transport by improved flowability. Likewise, the humectant improves assimilation and transport by tend to maintain a moist or wet state in which the ferric iron may be best passed into the membranes of foliage and transported within the leaves. In the diluted state, preferably including the surfactant and/or humectant each of which also serve to improve sprayability and thus improved coating of the foliage, the diluted solution is thereafter sprayed as a fine mist or spray onto foliage of plants at an amount ranging up to about 5 lbs. of iron per acre, and/or 20 to 40 gallons of the diluted solution per acre.

The invention includes a preferred method of making the above-described inventive composition. Either ferrous sulfate is commercially purchased from commercially available source(s), or is preferably produced by reaction of iron metal with sulfuric acid thereby producing the ferrous sulfate. A neutralizing amount of typically ammonium hydroxide is added to adjust pH to about pH 6 to pH 7 for the final composition. Preferably before adding citric acid at a mol ratio ranging from about 0.5 to about 2 relative to ferric iron, ferrous sulfate is heated to an oxidizing temperature of about 90 degrees Centigrade and/or the ferrous sulfate is otherwise oxidized by the addition of nitric acid, or both, accompanied by sufficient heat to drive-off the nitric oxide($N_2O_2$). The pH preferably is adjusted to 6.4–6.6. Citric acid when used as the complexing agent, obtains a product superior for the present invention, and thus preferred, as compared to the alternative chelating agents such as glutaric acid and/or glutamic acid previously noted. Preferably nitrate(s) is/are employed in the process of making sufficiently in amounts to obtain N(nitrogen) from nitrate-source in a nitrate/ferric-iron ratio of at-least 0.5/1. The iron is believed to be complexed with the citrate, but affected by the presence of the other detailed ingredients.

While there is no certainty, it is believed that the ferric complex includes at-least a major amount of ferric ammonium citrate, as set-forth in the following disclosure.

The present invention contemplates ferric iron with citric acid and/or glutaric acid and/or glutamic acid complexing agent, water-soluble nitrogen nutrient, and water in the above-noted proportions. Optimally other nutrients may be included provided such do not interfere with making soluble the iron nor interfere with assimilation and/or transport within and/or by the foliar-spray-treated plants, as noted above any phosphate being excluded as excessively detrimental to and negating the present invention if present in an amount more than between about 1% or 1.5% by weight of the present chemical composition.

As previously noted, citric acid has been known to be a chelating and/or complexing heretofore, and as also noted-above, iron in the presence of complexing agent has been sold and commercially available for the treatment by foliar spray, iron deficient plants.

However, among other experiments, it has been determined by the present inventors, that the result of the present invention is not achieved in the absence of the combination use therewith, of nitrogen-providing soluble-sources such as ammonium nitrate and/or urea and/or the like, in the amounts specified above in the definition of the present invention. Such experiments are included hereinbelow. Likewise included are experiments evidencing the superiority of the results of the present invention to use of mere sulfate(s) alone. And as also noted-above, it has been ascertained that the iron must be ferric, at-least as to a predominant/majority proportion thereof in the present inventive chemical composition as defined-above.

The preferred form of these materials is ferric ammonium citrate, preferably prepared as above-noted first preparing the ferric citrate as a preferred first step, followed by ammoniating typically with anhydrous ammonia or ammonium hydroxide, also adjusting acidity to the pH set-forth above.

In utilizing the present inventive chemical composition as a specialized iron-supplementing fertilizer for use as a foliar spray, as above-noted the concentrated final composition may be dissolved and/or diluted by addition of water with or without surfactant prior to the foliar application thereof to the iron-deficient plants, and applying up to about 5 lbs. of iron per acre by the spraying thereof.

EXAMPLES

Example 1

A field experiment was initiated on grain sorghum in Guilford County, North Carolina to evaluate three liquid iron sources for crop safety when applied as foliar sprays.

These three sources were identified as RES 22378, 22379 and 22380. Sample RES 22378 is a commercial product (NFE) and was prepared as follows:

Sample 22379 was formulated by using ferric sulfate; both samples 22378 and 22379 were formulated for about 16% N(wt.) and 4% Fe(wt.) as noted above.

Sample 22380 was prepared according to the Parham U.S. Pat. No. 3,798,020) whereby ammonium polyphosphate can be used along with citrate as complexing agents for micronutrients. This sample contained 5% total N(wt.), 15% $P_2O_5$(wt.) 5% $K_2O$(wt.) and 2% Fe(wt.). A product of this type having 4% Fe(wt.) was not stable, precipitating out and thus totally unsuitable for foliar application at that Fe %.

Foliar field treatment consisted of dipping the uppermost fully expanded grain sorghum leaf into the iron solutions and removed immediately. Treated leaves remained on the intact plants. Leaf injury was rated at one and three days after treatment.

Source and solution concentrations are noted in the attached table. The three sources were used undiluted (Tr. 1, 2 and 3). Sources 22378 and 22379 (containing 4% Fe(wt.)) were used at 50% dilution to apply the same amount of iron as the 2% sample (22380). The three sources were also used (Tr. 6, 7 and 8) at an equivalent iron rate comparable to that currently recommended for correcting iron deficiency in sorghum when sprayed on the foliage at a solution rate of 20 gallons per acre.

As noted in the table, all solutions containing 100 or 50% of the formulations caused major leaf desiccation of sorghum. When used at the recommended foliar iron application rate Tr. 6, 7 and 8, major leaf injury occured only for sample 22380. Samples 22378 and 22379 resulted in only minor injury confined to the outer leaf margins.

These results indicate that a foliar iron product should contain the inventive formulation described above for this invention. A combination of citric acid and polyphosphate caused major leaf injury and could not be accepted by a commercial sorghum producer as a foliar spray product.

Example 2

Cursory experiments were performed with regard to rate of conversion of ferrous ($Fe++$) iron to ferric

| Raw Material | Wt. % | Total N wt. % |
| --- | --- | --- |
| Ferric Ammonium Citrate (17.8% Fe-7.5% N, wt.) | 22.6 | 1.6 |
| URAN (Trademark of Arcadian Corp. - ammonium nitrate and urea composition - 32% N, wt.) | 45.0 | 14.4 |
| $H_2O$ (water) | 32.4 | |
| (Total N (wt.)/FE (wt.) = 4.00)  Total: | 100.0 | 16.1 |
| Sample RES 22379 was produced in the laboratory as follows: | | |
| Raw Material | Wt. % | Total N wt. % |
| Citric Acid (monohydrate) | 15.2 | |
| Ferric Sulfate (21.2% Fe-19.7% S, wt.) | 18.9 | |
| $NH_4OH$ (23% N wt.) | 22.8 | 5.244 |
| URAN (32% N, wt.) | 33.8 | 10.816 |
| $H_2O$ | 9.3 | |
| (Total N (wt.)/Fe (wt.) = 4.01)  Total: | 100.0 | 16.06 |
| Sample RES 22380 was also produced in the laboratory as follows: | | |
| Raw Material | Wt. % | Total N wt. |
| POLY-N (11% N-37% $P_2O_5$-0.5% Fe, wt.) | 40.6 | 4.466 |
| Sodium Citrate Solution (30%, wt.) | 13.3 | |
| $FeCl_3$ Solution (11.85% Fe, wt.) | 15.2 | |
| URAN (32% N, wt.) | 1.9 | 0.608 |
| KCl (62% $K_2O$, wt.) | 8.1 | |
| $H_2O$ | 20.9 | |
| (Total N (wt.)/Fe (wt.) = 2.532)  Total: | 100.0 | 5.074 |

(Fe+++) iron for species in solutions. We prepared two aqueous solutions containing about 5% Fe from ferrous sulfate. Solution 1 contained only ferrous sulfate and deionized water. Its pH was 3.4. Solution 2 (pH 3.1) also contained 14.3 ammonium nitrate (5% nitrate N). The two solutions were gently aerated with lab air for a week at room temperature with conversions to ferric iron as noted below:

| Measurement Time | % of Total Iron in Ferric-state | |
|---|---|---|
| | Solution 1 | Solution 2 |
| Initial measurement | 1 | 1 |
| Measurement after 4 hours | 1 | 1 |
| Measurement after 24 hours | 1 | 1 |
| Measurement after 1 week | 21 | 47 |

Values given(found), especially solution 2, may be higher than true values because at the end of one week both solutions contained some red precipitate of ferric hydroxide. They were therefore acidified with HCl and heated briefly before the last analysis in order to return all iron to solution, possibly such treatment having caused formation of nitric acid resulting in further oxidation from ferrous to ferric iron at an accelerated and/or addition rate and amount.

In the method of foliar spraying, the above-noted inventive composition is foliar-sprayed onto one or more of grain sorghum, spinach, soybeans, onions, lettuce, peanuts, celery, orange tree, lemon tree, and/or avocado tree.

The same type sample as RES 22378, i.e. Arcadian Corp.'s NFE was evaluated in Texas in foliar spray treatment of grain sorghum, using ferrous sulfate, and it was noted that the sample caused less phytotoxicity damage to the foliage than anticipated from ferrous product; accordingly, upon analysis of the product by GDL analysis, it was discovered that this older sample had converted by about 90.4% from ferrous to ferric iron content. Thereupon another old sample was analyzed from another source, also NFE, and it was found that there had been 73% Fe++ (ferrous) conversion to ferric. As noted-above, it had been noted that the ferric iron of the present invention gives preferred improved results as compared to ferrous, such results being reflected by the above-noted sample experiences.

In the following examples, the following stock "Solution A" was used:

| ferric ammonium citrate | 22.6% by weight |
|---|---|
| ammonium nitrate-urea mixture | 45.0% by weight |
| water | 32.4% by weight |

The ferric citrate typically contained about 17.8% iron, about 7.5% nitrogen and about 60% citrate(calculated on the basis of citric acid). The ammonium nitrate-urea solution was a commercial ammonium nitrate-urea solution containing about 45.1% by weight ammonium nitrate, 34.8% by weight urea and 20.1% by weight water. Analysis of the above solution indicated 16% total nitrogen including 5.1% ammoniacal nitrogen, 3.7% nitrate nitrogen and 7.3 urea nitrogen (all by weight % as N(nitrogen)). The product also had 4% iron by weight (as Fe). The solution had a specific gravity at 15.6 degrees Centigrade (60 degrees Fahrenheit) of 1.280 compared to water at a like temperature. The pH of the stock solution was 6.5. The solution was stable down to a temperature of −16.7 degrees Centigrade (2 degrees Fahrenheit) where crystallization occured.

Example 3

Greenhouse application to corn, soybeans and ferns.

The above Solution A was applied to corn at a 5 to 6 leaf stage, soybeans at a stage of 2 trifoliates and ferns at a height of 6 to 12 inches (15-30 cm) at iron levels of 0,0.11, 0.22 and 0.45 kg/ha (0,0.1,0.2 and 0.4 pounds per acre), all by weight of iron per area of greenhouse foliage. After 18 days, the leaves of the various plants were examined for apparent injury, the corn and soybeans were judged uninjured, while the fern had levels of 0, 0.3, 1.5 and 3.0, respectively. Also on the 18th day, leaf samples were taken: the 8th and 9th leaves of the corn and the upper two trifoliates of the soybeans. Iron levels in ppm were determined as indicated in Table 1.

TABLE 1

| Run | Iron Application (kg/ha) | Tissue Analysis (Fe ppm) corn | (Fe ppm) soybeans |
|---|---|---|---|
| A | 0.00 | 101 | 153 |
| B | 0.11 | 112 | 145 |
| C | 0.22 | 130 | 135 |
| D | 0.45 | 157 | 138 |

Example 4

Field application to grain sorghum

To a field of sorghum 2 ft. (0.6m) in height, prior to heading, 40 blocks were selected and, on a random basis, subjected to one of ten treatments. The first group of blocks were untreated. The next three groups of blocks were treated with the above Solution A at iron levels of 0.28, 0.56 and 1.12 kg/ha (0.25, 0.50 and 1.00 pound per acre). The next three groups at blocks were treated with a lignin sulfonate chelate having 5% iron at iron levels of 0.28, 0.56 and 1.12 kg/ha (0.25, 0.50 and 1.00 pound per acre). The last three groups of blocks were treated with iron sulfate having 20% iron at iron levels of 0.28, 0.56 and 1.12 kg/ha (0.25, 0.50 and 1.00 lbs. per acre). After 10 days, leaf samples were taken as the second leaf from the top, taking 20 leaves from each of the 40 blocks. The leaves were washed in 0.1 Normal hydrogen chloride solution, rinsed twice in distilled water and measured for iron (as ppm) by A & L Agricultural Laboratories, Memphis, Tenn., a commercial tissue testing laboratory. In addition, the leaves were rated for color on a scale of 1 to 5 with 1 representing chlorosis and 5 representing good green color. The results are displayed in the following Table 2.

TABLE 2

| | | Sorghum | | |
|---|---|---|---|---|
| Run | Iron Source | Rate (Fe kg/ha) | Tissue (Fe ppm) | Color Rating |
| A | Control | 0 | 73 | 1.0 |
| B | Solution A | .28 | 105 | 2.5 |
| C | Solution A | .56 | 98 | 4.3 |
| D | Solution A | 1.12 | 84 | 4.8 |
| E | Chelate | .28 | 84 | 2.0 |
| F | Chelate | .56 | 89 | 2.3 |
| G | Chelate | 1.12 | 78 | 3.5 |
| H | Sulfate | .28 | 85 | 1.8 |
| I | Sulfate | .56 | 79 | 2.0 |
| J | Sulfate | 1.12 | 98 | 2.8 |

Example 5

Peanuts

In similar fashion, using the same number of blocks and the same techniques for selecting blocks and the same iron analysis techniques, a comparison was run of the above stock solution against an iron-EDTA complex solution sold by Ciba-Geigy Corporation as Sequestrene 330, Which has about 10% iron by weight, and against an iron sulfate solution having about 20% iron. Twenty-seven days after application, whole plant samples were taken, washed with 0.1 Normal hydrogen chloride solution and rinsed twice in distilled water. In addition to determining the iron level, a yield was measured 2 months after application in kg/ha (also indicated in pounds/acre) and the quality of the harvested peanuts was determined by New Mexico Department of Agriculture from grading each sample as sound mature kernels (SMK) and discolored kernel (DK). The results are displayed in Table 3.

TABLE 3

| | Iron Source | Iron Rate (Fe kg/ha) | Tissue (Fe ppm) | Yield* (kg/ha and lbs/A) | Quality % SMK | % DK |
|---|---|---|---|---|---|---|
| A | Control | 0 | 366 | 498 (445) | 68 | 16 |
| B | Solution A | 0.56 | 401 | 886 (791) | 71 | 14 |
| C | Solution A | 1.12 | 467 | 948 (846) | 70 | 10 |
| D | Solution A | 2.24 | 531 | 924 (825) | 68 | 12 |
| E | EDTA Complex | 0.56 | 311 | 1086 (970) | 69 | 14 |
| F | EDTA Complex | 1.12 | 280 | 972 (868) | 67 | 16 |
| G | EDTA Complex | 2.24 | 348 | 1279 (1142) | 66 | 20 |
| H | Iron Sulfate | 0.56 | 404 | 930 (830) | 69 | 18 |
| I | Iron Sulfate | 1.12 | 473 | 982 (877) | 70 | 5 |
| J | Iron | 2.24 | 483 | 960 (857) | 69 | 18 |

*All yields are significantly higher than the control at the 95% probability level.

Example 6

Application to onions and lettuce

In a similar fashion, six plots of onions and six plots of lettuce were treated with one of six treatments with water at a solution rate of 188 L/ha (20 gal/acre): (A)-control, (B)Solution A 0.28 kg/ha (0.25 pound/acre) Fe, (C) Solution A 0.56 kg/ha (0.50 pound/acre) Fe, (D)Solution A 1.12 kg/ha (1.00 pound/acre) Fe, (E)Solution A 0.28 kg/ha (0.25 pound/acre) Fe+Tween 80 nonionic surfactant (Tween being a trademark of ICI Americas) 0.1% by volume of spray solution, and (F) Greenol (a trademark of Chevron Chemical for a solution containing iron sulfate with 6.13% Fe, 0.13% Cu, 0.10% Zn and 3.65% S) 0.56 kg/ha (0.50 pound/acre) Fe.

The onions were growing in a soil having 22 ppm iron and were treated at 25–30 cm (10–12 inch) height growth stage. Tissue samples (20 leaves) were taken 14 days after application at three locations within each plot.

The lettuce was growing in a soil having 24 ppm iron and was treated at a 13 cm (5 inch) diameter growth stage. Tissue samples (20 leaves) were taken 12 days after application from four replications.

The results are displayed in Tables 4 and 5.

TABLE 4

| | | Onions | | |
|---|---|---|---|---|
| Run | Source | Fe (kg/ha) | Solution (L/ha) | Analysis + (ppm Fe) |
| A | Control | 0 | 0 | 59 |
| B | Solution A | .28 | 188 | 103 |
| C | Solution A | .56 | 188 | 161 |
| D | Solution A | 1.12 | 188 | 201 |
| E | Solution A* | .28 | 188 | 191 |
| F | Sulfate Solution** | .56 | 188 | 193 |

+Run C, D, E, and F are significantly higher than the control at the 95% Probability level.

TABLE 5

| | | Lettuce | | |
|---|---|---|---|---|
| Run | | | | |
| A | Control | 0 | 0 | 181 |
| B | Solution A | .28 | 188 | 215 |
| C | Solution A | .56 | 188 | 301 |
| D | Solution A | 1.12 | 188 | 313 |
| E | Solution A* | .28 | 188 | 208 |
| F | Sulfate Solution** | .56 | 188 | 248 |

*Plus Tween-80 nonionic surfactant
**Greenol - 6.13% Fe, 0.13% Cu, 0.10% Zn, 3.64% S.

Example 7

Application to spinach

Fifty-two random blocks of spinach were subjected to one of thirteen treatments (4 replications of each) at a volume of 188 L/ha (20 gal/acre) as follows: (A) control, (B) Solution A 0.28 kg/ha (0.25 pounds/acre) Fe, (C) Solution A 0.56 kg/ha (0.50 pound/acre) Fe, (D) Solution A 1.12 kg/ha (1.00 pound/acre) Fe, (E) Solution A 2.24 kg/ha (2.00 pounds/acre) Fe, (F) Sequestrene 138 (a trademark of Ciba-Geigy for an iron-EDTA complex) 0.28 kg/ha (0.25 pounds/acre) Fe, (G) Sequestrene 138 0.56 kg/ha (0.50 pounds/acre) Fe, H) Sequestrene 138 1.12 kg/ha (1.0 pounds/acre) Fe, I) Sequestrene 138 2.24 kg/ha (2.0 pounds/acre) Fe, J) ferrous sulfate 0.28 kg/ha (0.25 pound/acre) Fe, K) ferrous sulfate 0.56 kg/ha (0.50 pound/acre) Fe, L) ferrous sulfate 1.12 kg/ha (1.00 pound/acre) Fe and M) ferrous sulfate 2.24 kg/ha 2.00 pounds/acre) Fe. Treatment was at the 5–6 leaf stage. Samples of new growth were taken nine days later and analyzed for iron (as ppm Fe) with the results displayed in Table 6.

TABLE 6

| | | Spinach | |
|---|---|---|---|
| Run | Iron Source | Fe (kg/ha) | Analysis* (ppm Fe) |
| A | Control | 0 | 406 |

TABLE 6-continued

Spinach

| Run | Iron Source | Fe (kg/ha) | Analysis* (ppm Fe) |
|---|---|---|---|
| B | Solution A | .28 | 473 |
| C | Solution A | .56 | 647 |
| D | Solution A | 1.12 | 536 |
| E | Solution A | 2.24 | 640 |
| F | Sequestrene 138 | .28 | 410 |
| G | Sequestrene 138 | .56 | 475 |
| H | Sequestrene 138 | 1.12 | 524 |
| I | Sequestrene 138 | 2.24 | 556 |
| J | Sulfate | .28 | 485 |
| K | Sulfate | .56 | 528 |
| L | Sulfate | 1.12 | 539 |
| M | Sulfate | 2.24 | 466 |

*Runs C and E are the only significantly high values above the control at the 95% probability level. Viewed as an average of values, the invention results of B-E must be recognized as far superior to average results of Fe-chelated runs F-I that do not include the critical nitrogen sources of percentages. Likewise, the averaged results of mere sulfate and iron, of runs J-M were poor.

Example 8

Application to soybeans

Twenty random blocks of soybeans were subjected to one of seven treatments at a volume of 188 L/ha (20 gal/acre) as follows: (A) control, (B) Solution A 0.17 kg/ha (0.15 pound/acre) Fe, (C) Sequestrene 138 0.17 kg/ha (0.15 pound/acre) Fe, (D) Solution A 0.34 kg/ha (0.30 pound/acre) Fe, (E) Sequestrene 138 0.34 kg/ha (0.30 pound/acre) Fe, (F) Solution A 1.12 kg/ha (1.0 pound/acre) Fe and (G) Sequestrene 138 1.21 kg/ha (1.0 pound/acre) Fe. Treatment was at the sixth trifoliate stage. Samples of new growth were taken ten days later and analyzed for iron (as ppm Fe), with the results for each block displayed in Table 7.

TABLE 7

Soybeans

| Run | Iron Source | Applied Iron Level (kg/ha) | Analyses (ppm Fe) I | II | III | Average Iron Analysis* |
|---|---|---|---|---|---|---|
| A | Control | 0 | 125 | 132 | 128 | 128 |
| B | Solution A | 0.17 | 202 | 211 | 220 | 211 |
| C | Sequestrene | 0.17 | 191 | 177 | 186 | 185 |
| D | Solution A | 0.34 | 217 | 216 | 223 | 218 |
| E | Sequestrene | 0.34 | 213 | 131 | 206 | 183 |
| F | Solution A | 1.12 | 346 | 207 | 286 | 280 |
| G | Sequestrene | 1.12 | 202 | 165 | 198 | 188 |

*Run B, D, F, and G are significantly higher than the control at the 95% probability level.

Example 9

Lemon, Orange and Avacado Trees

Fourteen fertilizer concentrates were prepared and diluted with water to give the following nutrient weight concentrations:

| Run | Ingredients | % Fe | % N | % S |
|---|---|---|---|---|
| A | Brown FAC + AN—U | 4 | 16 | 0 |
| B | Brown FAC + (Fe-chelate) | 4 | 2.4 | 0 |
| C | AC | 0 | 2.4 | 0 |
| D | FC | 4 | 0 | 0 |
| E | AN—U | 0 | 16 | 0 |
| F | FAS + AN—U | 4 | 16 | 4.5 |
| G | FAS | 4 | 1 | 4.5 |
| H | AS | 0 | 4 | 4.5 |
| I | FS | 4 | 0 | 3.4 |
| J | FAC + U | 4 | 16 | 0 |
| K | U | 0 | 16 | 0 |
| L | FS + AN—U | 4 | 16 | 3.4 |
| M | Green FAC + AN—U | 4 | 16 | 0 |
| N | AC + AN—U | 0 | 16 | 0 |

FAC ferric ammonium citrate
AN—U ammonium nitrate-urea mixture
AC ammonium citrate
FC ferric citrate
FAS ferric ammonium sulfate
AS ammonium sulfate
FS Ferric sulfate
U urea Each was then diluted about 100:1 with water (containing 0.1% Surfactant AL 1517 from ICI Americas) to make up a 492 L (130 gal.) soln. equivalent, containing 0.23 kg (0.5 Pound) of iron in the case of the concentrates having 4% iron. Tree branches of each of the lemon trees, orange trees and avocado trees were dipped in each solution and in water and surfactant only (Run O). Leaf tissue (six replications) was taken from the lemon branches 60 days after treatment and from the orange branches 19 days after treatment. The average levels of iron in ppm is reported in Table 8. The avocado trees were observed to be damaged by all of treatments A-N after 19 days. The treated branches were evaluated on a scale of 0 to 10 in three replications with the average results as reported in Table 8, with 0 representing no injury and 10 representing all leaves having dropped off the tree branch. The terminal bud was dead in two of three cases in Run C, all three cases in Run D and one of three cases in each of Runs F, G and N.

TABLE 8

Lemon and Orange Trees

| Treatment | Fe | Analysis (ppm Iron) Lemon* | Orange* | Injury Level Avocado** |
|---|---|---|---|---|
| A Brown FAC + AN—U | 4 | 218 | 30 | 1.0 |
| B Brown FAC | 4 | 198 | 28 | 4.0 |
| C AC | 0 | 166 | 17 | 10.0 |
| D FC | 4 | 211 | 34 | 10.0 |
| E AN—U | 0 | 167 | 19 | 5.3 |
| F FAS – AN—U | 4 | 219 | 73 | 9.3 |
| G FAS | 4 | 206 | 70 | 8.7 |
| H AS | 0 | 157 | 18 | 7.8 |
| I FS | 4 | 226 | 84 | 4.3 |
| J FAC + U | 4 | 203 | 31 | 2.7 |
| K U | 0 | 159 | 16 | 6.7 |
| L FS + AN—U | 4 | 214 | 70 | 4.3 |
| M Green FAC + AN—U | 4 | 184 | 29 | 1.0 |
| N AC + AN—U | 0 | 219 | 16 | 8.3 |
| O Control | 0 | 185 | 14 | — |

*A difference from the control of 39 ppm for lemon trees or 19 ppm for orange trees was determined significant at a 95% probability level.
**Leaf damage on scale of 0 to 10, average of three replications with a difference of 3.1 being significant at a 95% probability level.

Of the above treatments A, B, J and M contained iron together with a nitrogen source and citrate while D had only citrate and F, G, and L had only the nitrogen source and I had neither. Iron levels were greater for oranges when sulfate was present (F, G, I and L) than when citrate was present (A, B, D, J and M). No significant differences in iron in the lemon tree leaves were observed between the various runs with different iron sources, although many of them were numerically better than the control. The leaf damage levels for avocado branches were lowest (below 5) for Runs A, B, I, J, L and M, high (5 to 8) for Runs E, H and K and highest (above 8) for RUNS C, D, F, G and N. All four runs with iron, nitrogen and citrate (A, B, J and M) thus had among the lowest injury levels (1.0, 4.0, 2.7 and 1.0, respectively).

Example 10

Celery

The fourteen diluted solutions (A-N) of Example 7 and a control were applied to celery 36 cm. (14 inches) in height at a rate of 492 L/ha (130 gallons per acre) so that, when iron was present, it was applied at a rate of 0.56 kg/ha (0.5 Pounds per acre). The first rain was about 60 hours after treatment and no leaf injury was noted four days after treatment. Samples were taken (6 replications) 26 days after treatment and analyzed for iron. The crop was also harvested 26 days after treatment. The tissue analysis in ppm iron and yields in metric tons (1000 kg) per hectare and British tons per acre are shown in Table 9.

TABLE 9

|  | Celery | | |
|---|---|---|---|
|  | Yield* Metric Tons/Hectare | British Tons/acre | Fe (ppm) Analysis Fe (ppm) |
| A Brown FAC + AN—U | 63.0 | 28.1 | 160 |
| B Brown FAC | 63.0 | 28.1 | 149 |
| C AC | 59.4 | 26.5 | 149 |
| D FC | 60.1 | 26.8 | 135 |
| E AN—U | 62.5 | 27.9 | 138 |
| F FAS + AN—U | 56.5 | 25.2 | 141 |
| G FAS | 56.7 | 25.3 | 151 |
| H AS | 56.9 | 25.4 | 146 |
| I FS | 59.0 | 26.3 | 160 |
| J FAC + U | 62.5 | 27.9 | 149 |
| K U | 59.4 | 26.5 | 130 |
| L FS + AN—U | 57.2 | 25.5 | 154 |
| M Green FAC + AN—U | 57.8 | 25.8 | 152 |
| N AC + AN—U | 59.2 | 26.4 | 148 |
| O Control | 59.4 | 26.5 | 147 |

*The yields and iron levels were not, generaly, significantly better than the control.

We claim:

1. An iron-supplement foliar fertilizer composition for foliar-application to iron-deficient plants, consisting essentially of: a first composition consisting essentially of complexing agent, ferric iron, a water-soluble nitrogen-source, at a pH ranging from about pH 6 to about pH 7, total nitrogen from said nitrogen-source being at-least 9% by weight and having a ratio to said ferric iron of at-least 3/1, said complexing agent being present at a mole ratio from about 0.5 to about 2 relative to ferric iron, up to a phosphate percentage of about 1.5% of phosphate by weight, and a second composition comprising water, said water being present in a diluting amount sufficient such that said first composition is in aqueous solution therein, ferric iron being more than 50% of all iron present.

2. The foliar fertilizer composition of claim 1, in which ferric iron is at-least about 90% by weight of all iron present, in which pH ranges within pH 6.4 to pH 6.6, in which said ratio of nitrogen/ferric iron is at-least about 4 to 1, in which said phosphate percentage of said phosphate is up to about 1% by weight, and the nitrogen-source being selected from the group consisting of non-phosphate nitrates and urea.

3. The foliar fertilizer composition of claim 2, in which said nitrogen-source is in a nitrate/ferric iron ratio of at-least 0.5/1 and phosphate percentage of phosphate is zero.

4. The foliar fertilizer composition of claim 3, including sulfate.

5. The foliar fertilizer composition of claim 3, in which also urea is present as at-least a major proportion of said nitrogen source, and said nitrogen source is present in an amount for said total nitrogen to be within a range of from about 13% to about 20% by weight, and ferric iron being at least 90% of all iron present, and in which said complexing agent is citric acid.

6. The foliar fertilizer composition of claim 5, in which said second composition consists essentially of said water present in an amount such that said first composition in ratio to said second composition by weight ranges from about 1/100 to 10/100, diluting said first composition such that said first composition constitutes from about 5% to about 40% by total volume of said first and said second compositions.

7. The foliar fertilizer composition of claim 6, including a surfactant in an amount ranging from about 0.5% to about 1% by weight relative to said second composition.

8. The foliar fertilizer composition of claim 6, including a humectant in an amount ranging from about 1% to about 5% by volume relative to said second composition.

9. A method of providing iron supplement to iron-deficient plants comprising foliar spraying onto plant foliage the fertilizer composition of claim 8.

10. A method of making the foliar composition of claim 5, comprising: admixing a first composition with a second composition, said second composition comprising a major amount of water in an amount sufficient for said first composition to be soluble in said second composition, said admixing including admixing-together complexing agent, ferrous iron, a water-soluble nitrogen source, and said second composition, while adjusting pH upwardly sufficiently for pH to be within a range of about pH 6.4 to about pH 6.6, and while adjusting relative amounts of said ferrous iron and said water-soluble nitrogen source and said complexing agent sufficiently to obtain parameters of said first composition of claim 5, and thereafter oxiding said ferrous iron to ferric iron.

11. A method of claim 10, in which said complexing agent includes a major amount of citric acid, and said ferrous iron and said citric acid being present as ferric ammonium citrate.

12. A method of making the foliar fertilizer composition of claim 10, including reacting iron metal with sulfuric acid sufficiently to obtain said ferrous iron and said sulfate.

13. A method of making the foliar fertilizer composition of claim 12, in which said oxidizing includes heating to a temperature of about 90 degrees Centigrade for a period sufficient to convert said ferrous iron to said ferric iron, and in which said adjusting pH comprises adding ammonia hydroxide.

14. The foliar fertilizer composition of claim 1, in which said second composition consists essentially of said water present in an amount such that said first composition in ratio to said second composition by weight ranges from about 1/100 to 10/100, diluting said first composition such that said first composition constitutes from about 5% to about 40% by total volume of said first and second compositions.

15. A method of providing iron supplement to iron-deficient plants comprising foliar spraying onto plant foliage the fertilizer composition of claim 14.

16. A foliar-spraying method of providing iron supplement to iron-deficient plants according to claim 15, in which said foliar spraying includes applying to plant foliage the foliar fertilizer composition at a rate of about 3 to 5 lbs. iron and 20 to 40 gallons of the first composition as diluted by said second composition, as a fine mist.

17. A method of making the foliar composition of claim 1, comprising: admixing a first composition with a second composition, said second composition comprising a major amount of water in an amount sufficient for the first composition to be soluble in the second composition, said admixing including admixing-together complexing agent, ferrous iron, a water-soluble nitrogen source, and said second composition, while adjusting pH upwardly sufficiently for pH to be within a range of about pH 6 to about pH 7, and while adjusting relative amounts of said ferrous iron and said water-soluble nitrogen source and said complexing agent sufficiently to obtain parameters of said first composition of claim 1, and thereafter oxidizing said ferrous iron to ferric iron.

18. A method of claim 17, in which said complexing agent includes a major amount of citric acid, and said ferrous iron and said citric acid being present as ferric ammonium citrate.

19. A method of making the foliar fertilizer composition of claim 17, including reacting iron metal with sulfuric acid sufficiently to obtain a ferrous sulfate providing said ferrous iron.

20. A method of claim 19, in which said complexing agent includes a major amount of citric acid, and said ferrous iron and said citric acid being present as ferric ammonium citrate.

21. An iron-supplement foliar fertilizer composition according to claim 1, in which said complexing agent and said ferric iron are present as ferric ammonium citrate.

* * * * *